United States Patent Office 3,654,350
Patented Apr. 4, 1972

3,654,350
PURIFICATION OF TEREPHTHALIC ACID
Enrique R. Witt and Jorge A. Blay, Corpus Christi, Tex., assignors to Celanese Corporation, New York, N.Y.
No Drawing. Filed Jan. 14, 1970, Ser. No. 2,962
Int. Cl. C07c 51/42
U.S. Cl. 260—525         10 Claims

ABSTRACT OF THE DISCLOSURE

Disclosed herein are several processes for purifying terephthalic acid (TPA). The primary inventive concept disclosed herein exists in the use of a minor amount of water to suppress color formation.

A substantially homogeneous admixture of TPA, a small amount of water, and preferably an agent, e.g. acetic acid, to promote destruction of 4-carboxybenzaldehyde (CBA) is heated to the melting point of the admixture for a time sufficient to reduce the concentration of CBA to the desired level.

BACKGROUND OF THE INVENTION

The present invention relates to the purification of terephthalic acid. More particularly, the present invention relates to the purification of terephthalic acid containing such impurities as 4-carboxybenzaldehyde.

Terephthalic acid is presently a very valuable industrial raw material because of its use in the manufacture of polyester synthetic fibers such as poly (ethylene terephthalate). However, commercial production of these polyester fibers has generally not been by the direct esterification of terephthalic acid because of the adverse effects of small amounts of impurities in the terephthalic acid. Instead the terephthalic acid is usually esterified with methanol to form dimethyl terephthalate which in turn is transesterified with the appropriate glycol and polymerized to form the polyester. Heretofore the conversion to dimethyl terephthalate has been considered necessary in order to eliminate the impurities in the terephthalic acid but it is readily apparent that it would be desirable to form the polyester directly from the terephthalic acid in order to eliminate the expensive and time consuming esterification, distillation and transesterification necessary when utilizing dimethyl terephthalate.

The adverse impurities in terephthalic acid are those arising during the course of its manufacture and therefore the particular impurities present may vary according to the process of manufacture. At the present time there are several methods for producing terephthalic acid such as the oxidation of alkylbenzenes. These oxidations of alkylbenzenes may be conducted for example by oxidizing p-xylene in the liquid phase with 30 to 40% nitric acid at about 200° C., either with or without added air or oxygen. Another method for the oxidation of p-xylene is with an oxygen-containing gas (such as air) at temperatures around 150° C. and in the presence of a heavy metal catalyst such as cobalt acetate or other Group VIII metal salts. This latter method is disclosed in U.S. Pats. 3,240,803, 3,171,856, 3,139,452, 3,119,860, 3,064,044, 3,004,066 and British Pat. 1,003,895. An alternative method for preparing terephthalic acid by the oxidation of alkylbenzenes is disclosed in U.S. Pat. 2,746,990 wherein diisopropyl benzene is oxidized to terephthalic acid.

The methods for producing terephthalic acid are not however limited to the oxidation of alkylbenzenes and U.S. Pats. 3,243,457 and 3,096,366 disclose the production of terephthalic acid by the rearrangement of the potassium salts of benzoic or phthalic acids. Such rearrangements are generally known as Henkel rearrangements.

Regardless of the methods of manufacture, the terephthalic acid will generally contain various impurities which are detrimental to polyester production, especially from the standpoint of color. The terephthalic acid produced by the processes now well known will generally have less than about 5% by weight of impurities in it.

Although all of the troublesome impurities have not been identified, some of the more common impurities are 4-carboxybenzaldehyde, o-phthalic acid, m-phthalic acid, and p-acetylbenzoic acid. Of these impurities, 4-carboxybenzaldehyde is generally the most troublesome impurity and its amount has been used extensively as a criterion of effectiveness in purification processes. Of course the specifications for a fiber grade terephthalic acid vary according to the type of polymerization process to be used in forming the polyester and according to the process of manufacturing the terephthalic acid, but the specifications for fiber grade terephthalic acid generally require less than about 50 parts per million 4-carboxybenzaldehyde. In view of the stringent purity requirements the term "crude" terephthalic acid as used herein is meant to cover not only terephthalic acid having large amounts of impurities but is also meant to include terephthalic acid having extremely small but undesirable amounts of impurities. For example, terephthalic acid containing at least 40 parts per million of 4-carboxybenzaldehyde might be too impure for some end uses and thus could be considered "crude" terephthalic acid as far the present invention is concerned. "Crude" terephthalic acid as used herein is also intended to cover and include terephthalic acid which may or may not have been subjected to other types of purification processes so as to purify partially the terephthalic acid.

Various processes have been devised to treat terephthalic acid for the removal of organic impurities and other impurities contributing to the quality and color of polyesters. Some of these processes include activated charcoal treatment of solutions of water soluble salts, alkaline oxidation with hypohalite or permanganate solutions of water soluble salts, water leaching, and treatment of aqueous solutions of alkaline salts with carbon monoxide. It has also been disclosed in such patents as U.S. 2,923,736, that crude terephthalic acid may be purified by sublimation followed by fractional condensation of the terephthalic acid from the resulting gas.

It is also disclosed in copending U.S. patent application Ser. No. 705,600, filed on Feb. 15, 1968, now abandoned, that crude terephthalic acid may be purified by heating it in an inert, liquid medium to a temperature above 325° C. followed by crystallization of the terephthalic acid from solution. It is also disclosed in copending U.S. application 705,616, filed Feb. 15, 1968, now abondoned, that metals from Groups I–B, II–B, and VIII of the Periodic Table serve as catalysts in the purification of terephthalic acid by thermal treatment of TPA in solution in an inorganic solvent at a temperature above about 325° C.

The presence of large amounts of a liquid medium increases the heat and pressure requirements, but, heretofore, it was throught that heating PTA, without first dissolving it in an inert liquid medium, would result in discoloration of the TPA, which discoloration would make the TPA unacceptable for fiber production.

SUMMARY OF INVENTION

It has now been discovered that the discoloration of TPA can be prevented by using a small amount of water. Thus, in accordance with the instant invention, a substantially homogeneous admixture of crude terephthalic acid and a small amount of water is heated to a temperature above the melting point of the admixture for a time sufficient to reduce the concentration of 4 - carboxybenzaldehyde to a desired level. In a preferred embodiment, a degradation agent, e.g. acetic acid, is employed to promote the destruction of CBA. After the CBA concentration is reduced by heating, the hot admixture is dissolved in a suitable solvent and the TPA is crystallized by cooling. The crystallization procedure removes other impurities such as metallic impurities.

DETAILED DESCRIPTION OF THE INVENTION

The CBA degradation agent, e.g. acetic acid, and water should be substantially homogeneously dispersed throughout the crude TPA. This type of admixture can be attained in a variety of ways. For example, one could simply mix the ingredients at ambient temperatures in known mixing apparatus. Or the ingredients can be admixed after first melting the TPA. The preferred method of forming the admixture comprises filtering crude TPA from the mother liquor in which it was prepared, washing the filter cake with water to displace the mother liquor, and evaporating water from the cake to reach the desired level. If the mother liquor is acetic acid (a useful agent for promoting destruction of CBA) the washing step can be modified in order to leave a small amount of acetic acid in the filter cake. Other methods will occur to those skilled in the art. Complete homogeneity is desired, but one can benefit from the use of water even if this is not attained. Thus, the use of the expression "substantially homogeneous" is employed to indicate that one should strive for that degree of homogeneity that is economically attractive.

The savings in heat and pressure requirements are obtained by using a major amount of crude TPA rather than by dissolving a minor amount of TPA in an inert organic medium. The homogeneous admixture should contain from 70 to 96 wt. percent crude TPA, preferably at least 85 wt. percent.

The water in the admixture should be a minor amount sufficient to prevent discoloration of the TPA. Water should constitute at least 4.0 wt. percent of the total composition and may constitute as much as 30%, or higher, but if higher percentages are employed, the process will have increased heat and pressure requirements. The use of 8 to 20 wt. percent water is preferred, with 10 wt. percent water being the most effective concentration found to date.

The use af a CBA degradation promoter is optional but highly desirable. The amount used will depend upon the promoter employed, the concentration of water, and the temperature employed, but in general, as little as 3 wt. percent is effective and one may wish to employ 10 wt. percent or more. Those skilled in the art will be able to determine that amount sufficient to promote the destruction of CBA. Suitable CBA degradation promoters include acetic acid, phenyl acetic acid, diphenyl acetic acid, propionic acid, butyric acid, substituted and unsubstituted monofunctional phenols, xylenols, ketones such as acetone, methyl ethyl ketone and cyclohexanone, iridium trichloride and tetrachloride, certain iodine and bromine compounds, and metal catalysts. Acetic acid is the preferred agent.

In summary, the substantially homogeneous admixture should comprise from 70 to 96 wt. percent crude TPA, from 4 to 30 wt. percent, preferably from 8 to 12% water and from 0 to 10% preferably 3 to 8 wt. percent of a CBA degradation agent, e.g. acetic acid.

The time required to reduce the concentration of CBA to the desired level will depend upon the temperature to which the admixture is heated, the amount of water employed, the effectiveness of the CBA degradation agent, if employed, and the end use of the TPA.

The temperature should be at least as high as the melting point of the admixture. This will vary depending upon the amount of additives, water and CBA degradation promoters employed. The melting point of crude TPA is about 428° C. in a sealed tube. The presence of water alone or in combination with acetic acid depresses the melting point of the admixture. Thus, the temperature may be in the range of from about 360° C. to 430° C., preferably from 370° C. to 400° C. The reaction vessel should be sealed to prevent loss of acetic acid and water vapor. In addition, the vessel should be filled to from 50 to 80% capacity to keep the water and acetic acid in the molten admixture. In this system, the pressures generated will depend primarily upon the amount of water and acetic acid present, the temperature and the degree to which the vessel is filled. In general, the pressure will be in the range of from 300 p.s.i.a. to 2000 p.s.i.a. If the vessel is filled to about 50% capacity, there will not usually be a need to add pressure, in the form of an inert gas, to the system.

The pressure required from the purification step will depend upon the temperature and the amount of water and acetic acid employed. Purifying TPA by heating to 420° C. an admixture of 85% TPA, 10% water, and 5% acetic acid would require a pressure of less than 500 p.s.i.g. This constitutes a preferred embodiment of the invention. Purifying TPA in this fashion would require only about ⅙ the heat that would be needed if a 15% TPA slurry were heated to 380° C. to destroy the CBA.

As mentioned above, the amount of water should be in the range of from 4 to 30 wt. percent. It is desirable, however, to use the minimum amount of water required to prevent discoloration, of TPA, because water tends to slow the destruction of CBA. Thus, the time required to reduce the level of CBA will be low if only about 10 wt. percent water is employed.

In general the time for which the admixture is heated should be in the range of from 1 to 30 minutes, preferably from 2 to 10 minutes. If an admixture comprising about 88% crude TPA, about 7% water, and about 5% acetic acid is heated to temperature of about 400° C. for about 15 minutes, one would obtain white TPA crystals containing about 100 p.p.m. CBA (4000 p.p.m. in original crude TPA). Further decrease in CBA content could be obtained by longer residence time or by a subsequent crystallization in a suitable solvent, e.g. acetic acid. The semi-purified PTA (containing 100 p.p.m. CBA) could be used for the production of bis--hydroxyethyl terephthalate. A fiber grade TPA must contain less than about 50 p.p.m. CBA and can be obtained by recrystallization or longer residence time as mentioned above.

The crude terephthalic acid to be treated according to the present invention may be derived from various sources and may be terephthalic acid which has been subjected to previous types of purification treatment. In general, the present invention is most useful in the purification of crude terephthalic acid derived from the oxidation of alkylbenzenes or from the rearrangement of inorganic salts of benzene carboxylic acids; however, best results are obtained when treating impure or crude terephthalic acid derived from the oxidation of p-xylene with an oxygen containing gas in the presence of a heavy metal catalyst. Whatever the source of the terephthalic acid, it can be stated that the present invention is useful in treating crude terephthalic acid containing 4-carboxybenzaldehyde, p-toluic acid, o-phthalic acid, m-phthalic acid and/or p-acetylbenzoic acid or mixtures thereof although it is most useful in removing 4-carboxybenzaldehyde impurities. As was pointed out above, terephthalic acid produced by the presently well known processes will generally have less than about 5% by weight of impurities and quite frequently less than 1% by weight impurities. It should be kept in mind that the thermal treatment step of the present invention does not remove or decompose all types of impurities, e.g. metal impurities, which may be found in a crude terephthalic acid, and thus the present process should be combined with other purification treatments such as simple recrystallizations. For example, when treating a mixture of 85% crude acid and 15% liquid medium in accordance with the present invention, it is desirable to dissolve the hot admixture in an inert liquid medium after the thermal treatment step and subsequently cool the solution to crystallize the TPA thereby removing other impurities.

The inert, liquid medium to be used for crystallization in the present invention should be one which has a boiling point above 20° C. and a melting point below 200° C. and can be water, organic compounds or mixtures of organic compounds and water. By "inert" is meant that the liquid medium is one which does not react with the terephthalic acid to any appreciable extent under the conditions of the process and one which is not destroyed to any appreciable extent under the conditions of the process such as by reacting with itself, polymerizing, etc.

Usually the inert organic medium utilized will be a member selected from the group consisting of $C_5+$ hydrocarbons, $C_2+$ halohydrocarbons, carboxylic acids, hydrocarbon ethers, halohydrocarbon ethers, and mixtures thereof. By "$C_5+$ hydrocarbons" is meant those having five or more carbon atoms while "$C_2+$ hydrocarbons" is intended to cover those having two or more carbon atoms. Of the hydrocarbons and halohydrocarbons that may be used, aromatics are preferred. Examples of suitable hydrocarbons, ethers, and halohydrocarbons include naphthalene, tetraline, biphenyl, xylene, benzene, cumene, n-hexane, cyclohexane, 2-methylheptane, the dodecanes, chlorotoluene, diphenyl ether, chlorinated biphenyls, chlorinated naphthenes, polyphenylene oxides, chlorinated diphenyl ethers, $C_{10}$ aromatic isomers, and the like. Of the carboxylic acids, the lower ($C_1$ to $C_7$) aliphatic carboxylic acids such as acetic, butyric, and propionic are preferred with acetic being preferred over the others. Other carboxylic acids which may be used include benzoic acid, phenylacetic and chlorobenzoic acid.

Very little external heat is required to dissolve the hot admixture into the inert liquid medium. If 20 parts of admixture at 400° are added to 80 parts acetic acid at about 250° C. the melt will dissolve and the TPA can be crystallized by subsequent cooling.

The efficacy of the instant invention is disclosed in the following examples:

EXAMPLE I

A substantially homogeneous admixture of 90 wt. percent crude TPA (containing 4000 p.p.m. CBA) and 10% water was prepared by adding the ingredients to a tube, sealing the tube, and raising the temperature to 150° C. for five minutes to disperse the water throughout the TPA. The temeprature was then raised to 420° C. for 10 minutes. The pressure generated was about 400 p.s.i.a. The partially purified TPA was white, i.e. no discoloration, and the CBA level, as determined by a standard poloragraphic method, was down to 714 p.p.m. A further decrease could have been obtained by longer treatment, subsequent crystallization in an inert organic liquid, or by using a CBA degradation promoter such as acetic acid.

EXAMPLE II

Two tests were run using 100% crude TPA. The samples were heated to 428° C. and 430° C. respectively for two minutes in a sealed tube. The CBA level was reduced from 4000 p.p.m. to 830 and 840 p.p.m. respectively, but in each case the TPA was brown in color.

EXAMPLE III

Tests were performed with other additives in an attempt to determine if there were other materials that would depress color formation. Three separate tests were performed using 90% crude TPA (containing 4000 p.p.m. CBA) in each case. Homogeneous admixtures were prepared by the same technique described in Example I. In the first test, a homogeneous admixture containing 10 wt. percent tetraline was heated to 430° C. for 3 minutes in a sealed tube.

The test was repeated first using 10 wt. percent xylene and then 10 wt. percent diphenylacetic acid. The CBA levels were reduced to 182 p.p.m., 375 p.p.m., and 329 p.p.m. respectively, but in each test the TPA was discolored.

EXAMPLE IV

Two tests were run, the results of which demonstrate of that the CBA level can be reduced by adding small amounts of acetic acid. In each test, the homogeneous admixture comprised 90% crude TPA and was heated to 420° C. for five minutes. In the first test, the admixture contained 9% water and 1% acetic acid and in the second test it contained 7% water and 3% acetic acid. The CBA level was reduced from 4000 p.p.m. to 558 p.p.m. and 504 p.p.m. respectively and in each case the TPA crystals were white.

EXAMPLE V

A homogeneous admixture consisting of 90% crude TPA (CBA—4000 p.p.m.), 7% water and 3% acetic acid at 420° C. for 15 minutes. The CBA level was reduced to 118 p.p.m. and there was no discoloration.

EXAMPLE VI

Thirty parts by weight of the product of Example V at about 420° C. is added to 70 parts by weight of a solvent consisting of 95% acetic acid and 5% water at 280° C. to form a solution. The solution is cooled to room temperature to precipitate TPA substantially free of metallic impurities, toluic acid, benzoic acid, and para acetyl benzoic acid. The CBA level is reduced to about 10 p.p.m.

What is claimed is:

1. A method for improving the purity of crude terephthalic acid including reducing the level of 4-carboxybenzaldehyde, which process comprises heating a substantially homogeneous admixture of crude terephthalic acid and water to a temperature above the melting point of said admixture for a time sufficient to reduce the level of impurities to the desired level; said crude terephthalic acid being present in said admixture in a major amount and said water being present in a minor amount sufficient to prevent discoloration of the terephthalic acid.

2. A method according to claim 1 wherein said admixture comprises from 70 to 96 wt. percent crude terephthalic acid and from 4 to 30 wt. percent water.

3. A method according to claim 1 wherein said admixture is heated to a temperature of from 370° C. to 430° C. for from 1 to 30 minutes.

4. A method according to claim 1 wherein the hot admixture is subsequently dissolved in an inert organic liquid having a boiling point above 20° C. and a melting point below 200° C., and the solution is cooled to precipitate the terephthalic acid.

5. A method for improving the purity of crude terephthalic acid including reducing the level of 4-carboxybenzaldehyde comprising heating a substantially homogeneous admixture comprising 70 to 96 wt. percent crude terephthalic acid, 4 to 30 wt. percent water and from 0 to 10 wt. percent of a carboxybenzaldehyde degradation agent selected from the group consisting of acetic acid, phenyl acetic acid, diphenyl acetic acid, propionic acid, butyric acid, substituted and unsubstituted monofunctional phenols, xylenols, ketones, iridium trichloride and iridium tetrachloride to a temperature of from 360° C. to 430° C. for a time sufficient to reduce the amount of carboxybenzaldehyde to the desired level.

6. A method according to claim 5 wherein acetic acid is employed as the degradation agent.

7. A method for improving the purity of crude terephthalic acid including reducing the level of 4-carboxybenzaldehyde comprising:

(a) heating a substantially homogeneous admixture comprising from 70 to 96 wt. percent crude terephthalic acid, from 4 to 30 wt. percent water and from 0 to 10% of a carboxybenzaldehyde degradation agent selected from the group consisting of acetic acid, phenyl acetic acid, diphenyl acetic acid, propionic acid, butyric acid, substituted and unsubstituted monofunctional phenols, xylenols, ketones, iridium trichloride and iridium tetrachloride to a temperature above the melting point of said admixture for a time sufficient to reduce the concentration of carboxybenzaldehyde to the desired level, (b) dissolving the molten admixture into an inert organic liquid having a boiling point above 20° C. and a melting point below 200° C., and (c) cooling the solution to precipitate the pure terephthalic acid.

8. A method according to claim 7 wherein acetic acid is the degradation agent.

9. A method according to claim 7 wherein said admixture is heated for from 1 to 30 minutes.

10. A method according to claim 7 wherein said inert organic liquid is acetic acid.

References Cited

UNITED STATES PATENTS 3,452,088  6/1969  Olsen et al. ---------- 260—525
3,364,256  1/1968  Ichikawa et al. ------ 260—525

JAMES A. PATTEN, Primary Examiner

R. S. WEISSBERG, Assistant Examiner